(12) United States Patent
Sanders et al.

(10) Patent No.: US 6,665,940 B2
(45) Date of Patent: Dec. 23, 2003

(54) TRIMMER WITH OUTPUT SHAFT LOCKING MECHANISM

(75) Inventors: Warren Sanders, Nashville, AR (US); Ronnie Church, Murfreesboro, AR (US)

(73) Assignee: Electrolux Home Products, Inc., Cleveland, OH (US)

( * ) Notice: Subject to any disclaimer, the term of this patent is extended or adjusted under 35 U.S.C. 154(b) by 59 days.

(21) Appl. No.: 09/795,703

(22) Filed: Feb. 26, 2001

(65) Prior Publication Data

US 2002/0116826 A1 Aug. 29, 2002

(51) Int. Cl.[7] .................................................. A01G 3/06
(52) U.S. Cl. .......................................... 30/276; 30/347
(58) Field of Search ...................... 30/276, 347; 57/12.7

(56) References Cited

U.S. PATENT DOCUMENTS

| | | |
|---|---|---|
| 4,358,230 A | 11/1982 | Rohlin |
| 4,467,896 A | 8/1984 | Sauerwein et al. |
| 4,489,525 A | 12/1984 | Heck |
| 4,690,252 A | 9/1987 | Kottke et al. |
| 4,735,020 A | 4/1988 | Schulz et al. |
| 4,804,048 A | 2/1989 | Porth, Jr. |
| 5,464,365 A | 11/1995 | Kirn |
| 5,887,489 A | 3/1999 | Zerrer |
| 6,032,369 A * | 3/2000 | Tada et al. ..................... 30/276 |

* cited by examiner

*Primary Examiner*—Douglas D. Watts
(74) *Attorney, Agent, or Firm*—Marc A. Hubbard; Munsch Hardt Kopf & Harr, P.C.

(57) ABSTRACT

A portable tool, such as a trimmer, with an output shaft locking pin disclosed. A gearbox of the portable tool includes a rotating shaft. A rotary member rotatable with the shaft is coupled to the shaft. A locking pin located along the exterior of the gearbox housing is constrained to move between at least two positions: a locking position and an unlocked position. In the locking position the locking pin extends below the gearbox housing to engage the rotary member mounted on the shaft, thereby locking the shaft. In the unlocked position the locking pin is retracted to avoid interference with the rotary member. The locking pin is biased to the unlocked position so that the top of the locking pin must be manually depressed to move and maintain the locking pin in the locking position.

11 Claims, 3 Drawing Sheets

TRIMMER WITH OUTPUT SHAFT LOCKING MECHANISM

TECHNICAL FIELD OF THE INVENTION

The present invention relates generally to the field of portable tools, and more particularly to an output shaft locking mechanism for a trimmer.

BACKGROUND OF THE INVENTION

In a cutting tool such as a brush cutter, a trimmer and/or the like, a rotatable cutting element is mounted in a positive interlocking or force-actuated manner, on an output shaft. The cutting element, such as metal or plastic blades, a line head or line carrier, may need to removed for various reasons. However, because removing it typically requires twisting either the cutting element or a fastener with respect to the axis of the output shaft, the output shaft must be typically held.

Many power tools include locking mechanisms for stopping rotation of an output shaft so that a cutting element or other tool element may be attached. However, these mechanisms suffer from various shortcomings. They tend to be relatively complex, which increases cost of assembly and renders them more susceptible to malfunction, and are sometimes not easy for an operator to use.

SUMMARY OF THE INVENTION

The present invention concerns an improved output shaft locking device for a trimmer or similar tool, which finds particular advantage on a power tool that includes a gear box with an output shaft, to which a cutting element is mounted.

A representative example of an embodiment of a locking mechanism according to the invention includes a pin or pin-like element that translates within a channel formed on the outside of a gear box housing. The pin does not penetrate the housing, thus avoiding another opening in the housing that must be sealed. Rather, when the pin is extended below the gear box housing to locking position, it interferes with a rotating element (other than the cutting or working element) that extends outwardly from, and rotates with, the shaft. Thus, the direction of translation can be generally characterized as parallel to the output shaft, but it need not be strictly so. The invention may be thus advantageously used on a vegetation cutting tool that already has a dust cap to keep dirt and other debris away from the seal between the output shaft and gear box, or similar element mounted on the shaft. Furthermore, the pin may be positioned to engage the non-working element some distance from the axis of rotation of the output shaft and any lateral force applied to the pin is distributed along the length of the channel. The gear box and locking mechanism will thus suffer less stress due to transfer of the torque from the output shaft to the pin, such as when the operator is attempting to remove the cutting or working element, or in the event an operator applies attempts to lock the output shaft while it is still rotating or while power is still being applied.

In order to extend the pin manually, the pin and channel are sized to reveal a top portion of the pin that may be depressed. In a retracted position, the pin is withdrawn into the channel far enough to avoid interfering with the rotation of the non-working element. Biasing the pin with a spring or similar element so that it automatically retracts it into the channel when it is not depressed reduces the risk that an operator attempts to run the tool with the shaft in a locked position, as manual force must be applied to the pin to keep it extended.

Other aspects and features of the invention will be apparent to those ordinarily skilled from the following description of specific embodiments of the invention in conjunction with the accompanying figures.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF THE DRAWINGS

The preferred embodiment of the present invention and its advantages are understood by referring to FIGS. 1 through 6 of the drawings, like numerals being used for like and corresponding parts of the various drawings.

Figure 1:
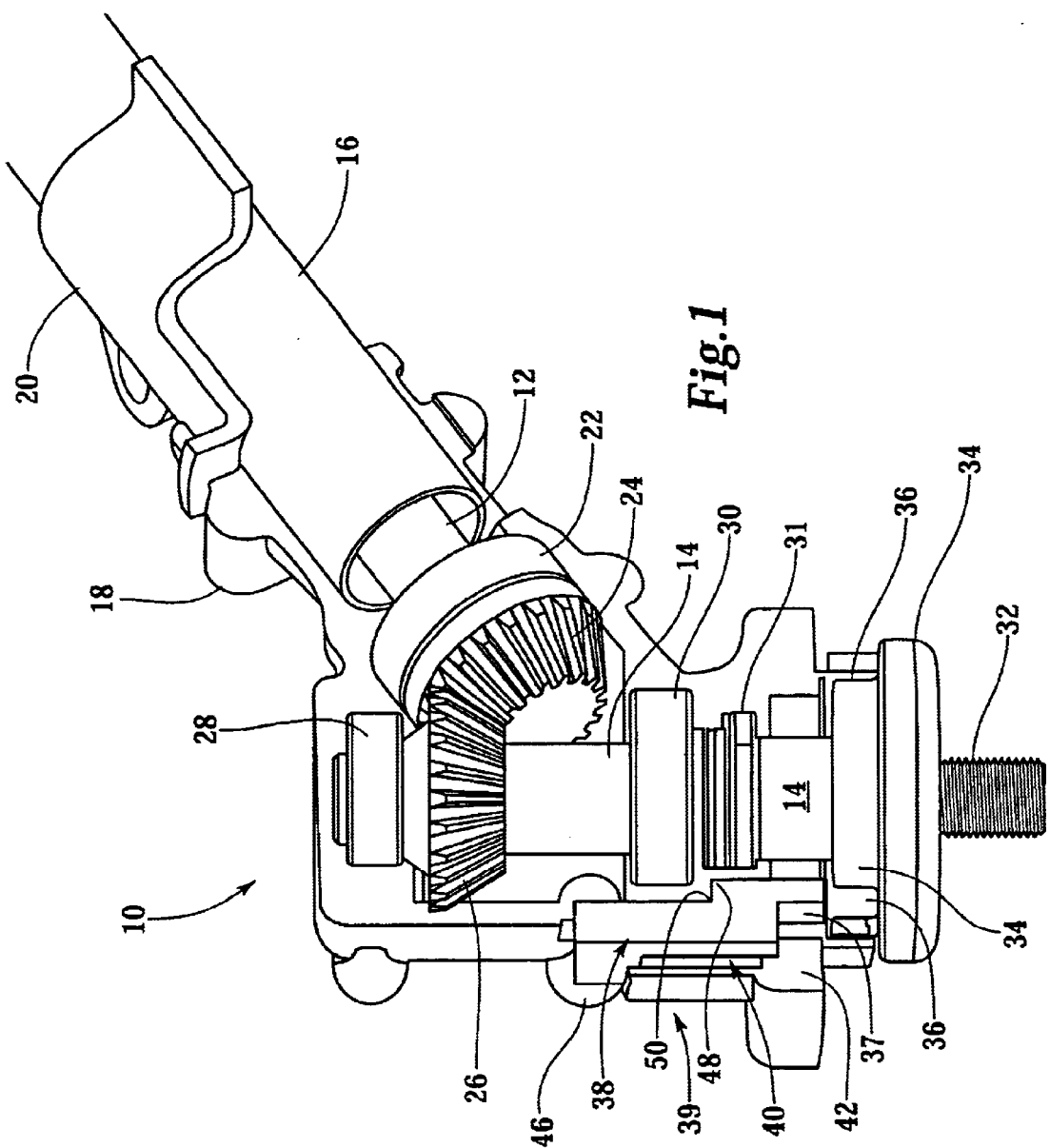
FIG. 1 is a sectional view of a gear box of a portable tool having a rotation preventing locking device for its output shaft in an unlocked position.
Figure 2:
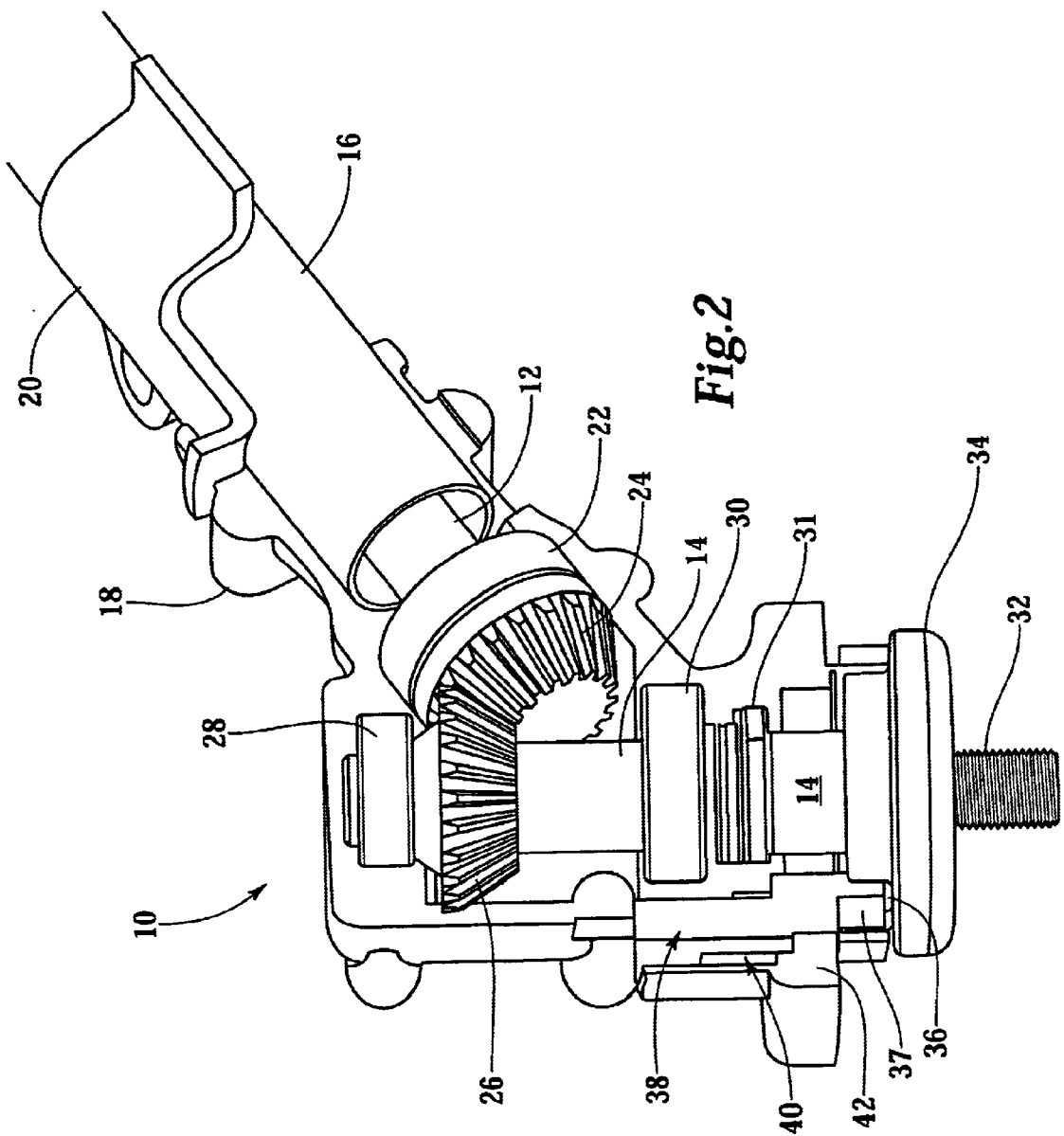
FIG. 2 is a sectional view of the gear box of FIG. 1, with the locking device in the locked position.
Figure 3:
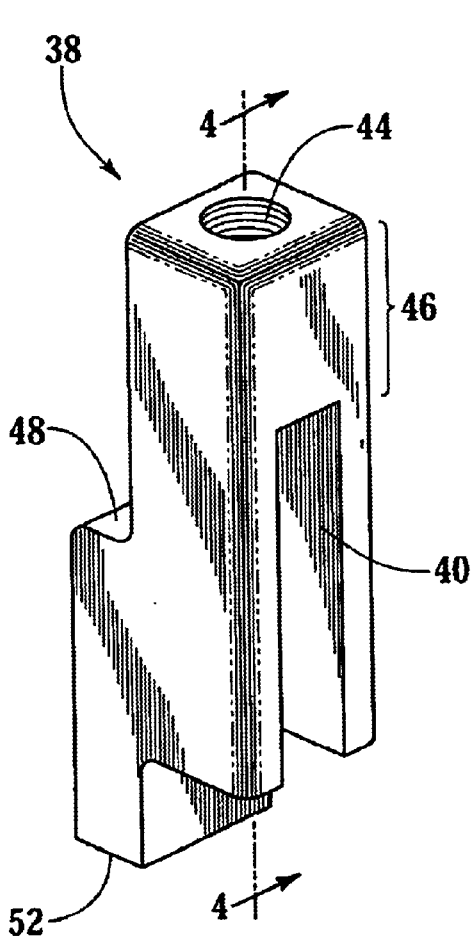
FIG. 3 is an isometric view of a locking pin of the locking device.
Figure 4:
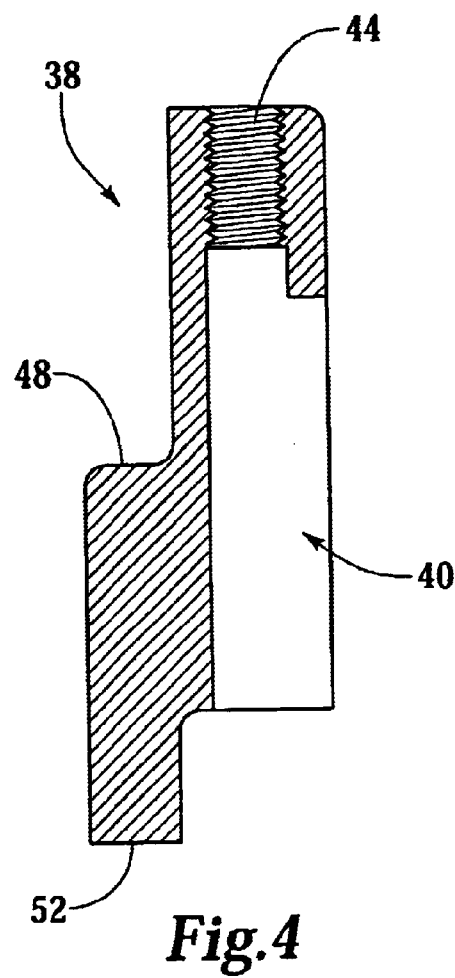
FIG. 4 is a sectional view of the locking pin of FIG. 3.
Figure 5:
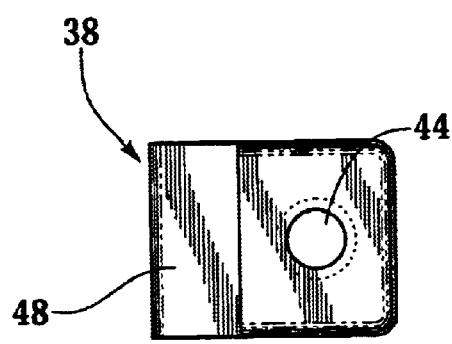
FIG. 5 is a top view of the locking pin of FIG. 3.

Referring to FIGS. 1 and 2, gearbox 100 of a vegetation trimmer is intended to be representative of a gear box of a portable tool, such as a trimmer, a brush cutter and/or the like. Such a gear box interconnects or couples a drive shaft with a relatively small output shaft, on which a cutting or other type of working element is mounted for rotation. The gear box may perform one or more of several purposes. First, it may function to couple two shafts at an angle so that the cutting element is properly oriented when the tool is held in a normal operating position. Second, it may alter the speed of rotation of the working element with respect to the drive shaft.

Gearbox 10 rotationally couples an input shaft 12 with an output shaft 14. Input shaft is one end of a drive shaft that transmits power from a remote rotary power source. The input shaft is disposed within a tube 16, to which the gear box is mounted. Although not shown, the drive shaft is journaled within the tube for rotation. The gear box includes a sleeve-like portion 18 that receives and supports the tube. Clamp 20 retains the gear box on the tube. Input shaft 12 is supported for rotation within the gear box housing by a radial bearing 22. The radial bearing is mounted in a pocket or slot formed on the wall of the sleeve-like portion of the gear box housing. A beveled gear 24 is connected to the input shaft. It meshes with a second beveled gear 26, which is connected to output shaft 14. The output shaft is supported for rotation by radial bearings 28 and 30. The bearings are mounted in slots or pockets formed in the wall of the gear box. Seal 31 seals the opening in the gear box through which the output shaft extends. The output shaft 14 includes a threaded end portion 32. A cutting tool, such as a line head, metal or plastic blades and/or the like, can be mounted directly on threaded end portion 32 of output shaft 14 or held on by means of a fastener such as a nut. Connections other than thread connections may be used as well.

A rotary member, such as dust cup 34, is attached to the threaded end portion of the output shaft. The dust cup keeps dust and debris away from seal 31 between gear box housing and the output shaft. At least one slot 36, and preferably more, is formed in a side wall of the dust cap for receiving at an end portion of a relatively elongated, pin-like member 38, which member will be referred to as a locking pin.

Referring now to FIGS. 1, 2 and 3–5, during assembly of the gearbox, locking pin 38 is placed in a channel 39 formed on an exterior wall of gearbox 10 so that it is permitted to translate within the channel generally along a line of its axis, and is otherwise constrained against rotational or other lateral movement. The direction and orientation of this line or movement may be generally characterized as parallel to the axis of rotation of the output shaft 14. Such parallel orientation comprehends or includes some angle or slant, provided that the channel does not extend into the sealed interior of the gear box.

The pin is biased toward an unlocked or retracted position by means of a compressed, coil spring (not shown) that is trapped on one end by a portion of the pin and the other end by a portion of the gear box. Preferably, the spring is disposed within a hollow portion of the pin to save space. As the locking pin descends from a retracted position to an extended or locking position, slot 40 formed along one side of the locking pin accommodates a tab 40 that extends into the channel from one of the walls of the channel. The tab extends far enough to hold one end of the spring. On the other end, the spring is held or trapped by a closed, top end of the locking pin. To facilitate assembly and replacement, the closed top end of the locking pin includes a thread opening 44, through which the spring may be inserted into the slot. A set screw (not shown) is inserted to close the opening.

The pin is, in FIG. 1, in a retracted or unlocked position. In this position, an exposed, button-like end portion 46 of the locking pin extends through an open top end of the channel. The pin includes a step or shoulder 48 that cooperates with a complementary shoulder 50 defined by the channel to stop movement of the pin out of the top end of the channel. In FIG. 2, the pin is in an extended or locking position. In the extended position, a tail portion 52 extends below a bottom edge of the gear box housing. In this position, the tail portion 52 interferes with rotating of the dust cap 34 by sliding into slot 36 and thereby engage the dust cap to lock it and the output shaft against rotation.

When an operator desires to mount or remove the cutting tool from the end of output shaft 32, the operator pushes down on the exposed end portion 46 of the locking pin and rotates the output shaft so that the tail portion 52 of the pen aligns with slot 36 of the dust cup 34. To keep the output shaft locked, the operator must continue to press the end portion 46.

While the invention has been particularly shown and described by the foregoing detailed description, it will be understood by those skilled in the art that various other changes in form and detail may be made without departing from the spirit and scope of the invention.

What is claimed is:

1. A vegetation cutting tool comprising:
    a rotary power source;
    a drive shaft for transmitting the rotary power to a gear box, the gear box coupling the drive shaft to an output shaft;
    a vegetation cutting member connected to the output shaft;
    a rotary member coupled to the output shaft, between the cutting member and the gear box, so that it rotates with the shaft; and
    a locking pin disposed within, and remaining within during operation of the trimmer, a channel formed along an exterior of the gear box and constrained to move only along a line that is generally in a direction parallel to an axis of the output shaft, the locking pin having a manually-depressible exposed portion and moving between an unlocked position and a locking position upon application of a manually-applied force to the exposed portion;
    wherein in the locking position the locking pin interferes with the rotary member to prevent rotation of the output shaft and in the unlocked position does not interfere with rotation of the rotary member.

2. The tool of claim 1, wherein the locking pin includes an exposed portion extending from an open end of the channel when it is in an unlocked position, whereby manually depressing the exposed portion slides the locking pin into the locking position.

3. The tool of claim 1 further including a spring for biasing the locking pin toward the unlocked position when the pin is in the locking and unlocked positions.

4. A vegetation cutting tool, comprising:
    a rotary power source;
    a drive shaft for transmitting the rotary power to a gear box, the gear box coupling the drive shaft to an output shaft;
    a vegetation cutting member connected to the output shaft;
    a rotary member coupled to the output shaft, between the cutting member and the gear box, so that it rotates with the shaft;
    a locking pin disposed within a channel formed along an exterior wall of the gear box and constrained to move only along a line that is generally in a direction parallel to an axis of the output shaft, the locking pin moving between an unlocked position and a locking position; and
    a spring for biasing the locking pin toward the unlocked position when the pin is in the locking and unlocked positions
    wherein in the locking position the locking pin interferes with the rotary member to prevent rotation of the output shaft and in the unlocked position does not interfere with rotation of the rotary member, and
    wherein the spring is placed within a hollow center of the locking pin and a tab extending from the gear box acts to maintain compression on the spring.

5. The tool of claim 4, wherein a slot is defined along one side of the locking pin to accommodate the tab as the locking pin slides between the locked and unlocked positions.

6. The tool of claim 4, wherein the rotary member includes a dust cap.

7. A vegetation cutting tool comprising:
    a rotary power source;
    a gearbox coupled to the rotary power source and having an output shaft, a cutting element connected to the output shaft, and a locking pin coupled to remain with during normal use, but operatively disposed outside a sealed interior of, the gear box and having a manually-depressible, exposed portion;
    wherein the locking pin operates to move generally parallel to said shaft from a first position, in which the locking pin has an upper end portion thereof exposed to a second position when the upper end portion of the locking pin is depressed; and
    wherein, in the second position, a bottom portion of the locking pin extends below said gearbox housing and prevents rotational movement of the output shaft by engaging with a rotary member coupled to said shaft and, in the first position, the locking pin avoids interference with the member.

8. The vegetation cutting tool of claim 7 wherein said rotary member includes a disk-shaped portion.

9. The vegetation cutting tool of claim 8 further comprising a spring for applying a force to the locking pin to bias it toward the first position, whereby force must be applied to the upper end of the locking pin by depressing it in order to maintain the locking pin in the second position.

10. A vegetation cutting tool comprising:
- a rotary power source;
- a drive shaft for transmitting the rotary power to a gear box, the gear box coupling the drive shaft to an output shaft;
- a vegetation cutting member connected to the output shaft;
- a rotary member coupled to the output shaft, between the cutting member and the gear box, so that it rotates with the shaft; and
- a locking pin constrained to move linerarly within a channel disposed along the gear box and cooperating with the channel for preventing removal of the pin from the channel during normal operation: the pin being biased toward a first position in which the pin does not interfere with rotation of the rotary member, but being manually movable against the bias to a second position in which the pin interferes with rotation of the rotary member;

wherein a portion of the channel is open to expose a portion of the pin for allowing manual depression of one end of the pin to move the pin from the first position to the second position.

11. The vegetation cutting tool of claim 10, wherein the pin is biased with a compressible spring toward the first position.

* * * * *

UNITED STATES PATENT AND TRADEMARK OFFICE
CERTIFICATE OF CORRECTION

PATENT NO. : 6,665,940 B2
DATED : December 23, 2003
INVENTOR(S) : Sanders et al.

It is certified that error appears in the above-identified patent and that said Letters Patent is hereby corrected as shown below:

Column 4,
Line 48, please change "locked" to -- locking --;
Line 61, after "exposed" please add -- , --.

Signed and Sealed this

Twenty-ninth Day of June, 2004

JON W. DUDAS
*Acting Director of the United States Patent and Trademark Office*